US008834082B1

(12) United States Patent  
Landrum et al.

(10) Patent No.: US 8,834,082 B1  
(45) Date of Patent: Sep. 16, 2014

(54) WIND TURBINE BLADE RAILROAD TRANSPORTATION SYSTEM AND METHOD

(71) Applicant: Transportation Technology Services, Inc., Southlake, TX (US)

(72) Inventors: Scott C. Landrum, Southlake, TX (US); T. Christopher King, Keller, TX (US)

(73) Assignee: Transportation Technology Services, Inc., Southlake, TX (US)

( * ) Notice: Subject to any disclaimer, the term of this patent is extended or adjusted under 35 U.S.C. 154(b) by 0 days.

(21) Appl. No.: 14/202,732

(22) Filed: Mar. 10, 2014

Related U.S. Application Data

(63) Continuation of application No. 13/847,184, filed on Mar. 19, 2013, now Pat. No. 8,708,625.

(51) Int. Cl.
*B60P 3/40* (2006.01)
*B61D 3/16* (2006.01)

(52) U.S. Cl.
CPC .... *B60P 3/40* (2013.01); *B61D 3/16* (2013.01)
USPC .......................................................... 410/45

(58) Field of Classification Search
USPC ............. 410/32–35, 44, 45, 49, 53, 120, 156; 414/460; 280/404
See application file for complete search history.

(56) References Cited

U.S. PATENT DOCUMENTS

| | | | | |
|---|---|---|---|---|
| 4,150,628 | A * | 4/1979 | Keldenich | 410/45 |
| 7,303,365 | B2 * | 12/2007 | Wobben | 410/45 |
| 2004/0091346 | A1 * | 5/2004 | Wobben | 414/563 |
| 2005/0031431 | A1 * | 2/2005 | Wobben | 410/45 |
| 2005/0063795 | A1 * | 3/2005 | Jagos et al. | 410/49 |
| 2007/0189895 | A1 * | 8/2007 | Kootstra et al. | 416/9 |
| 2013/0343827 | A1 * | 12/2013 | Schibsbye et al. | 410/45 |
| 2014/0050547 | A1 * | 2/2014 | Hiremath et al. | 410/44 |

* cited by examiner

*Primary Examiner* — H Gutman

(74) *Attorney, Agent, or Firm* — Dan Brown Law Office; Daniel R. Brown

(57) ABSTRACT

A system for transporting an airfoil over a railroad utilizing a first railcar coupled to a second railcar. The system includes a root bracket that supports a root end of the airfoil on the first railcar, and is oriented to align a tip end of the airfoil toward the second railcar. A blade support is fixed to the second railcar and is disposed to support the airfoil along its midsection. A weight is hung from a tension member on the second railcar such that the force of gravity induces tension forces along the tension member. An urging member is disposed on the second railcar and oriented to engage the airfoil between the blade support and the tip end of the airfoil. The urging member is coupled to the tension member such that the tension forces are transferred to the urging member to induce lateral forces against the airfoil.

20 Claims, 7 Drawing Sheets

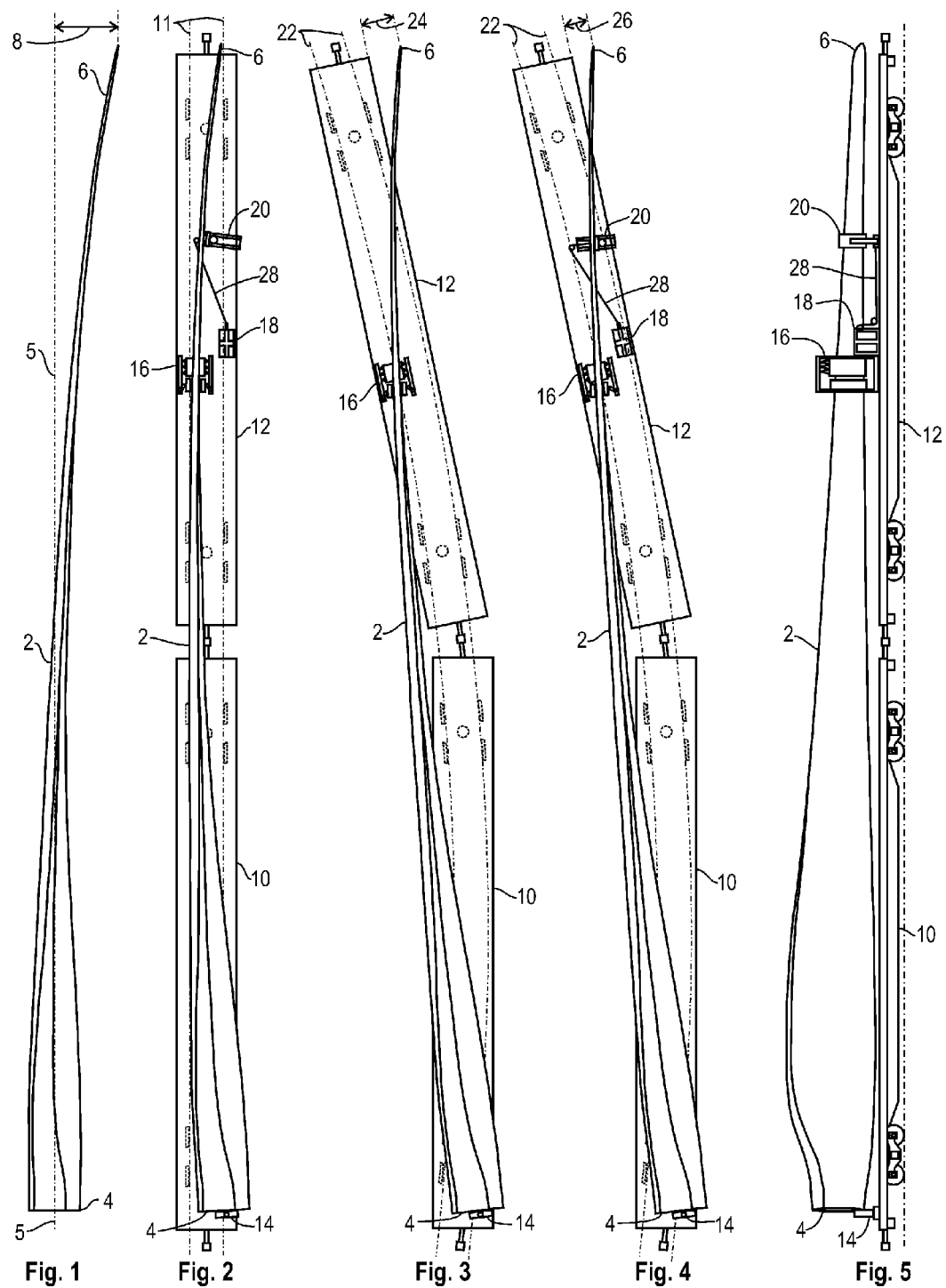

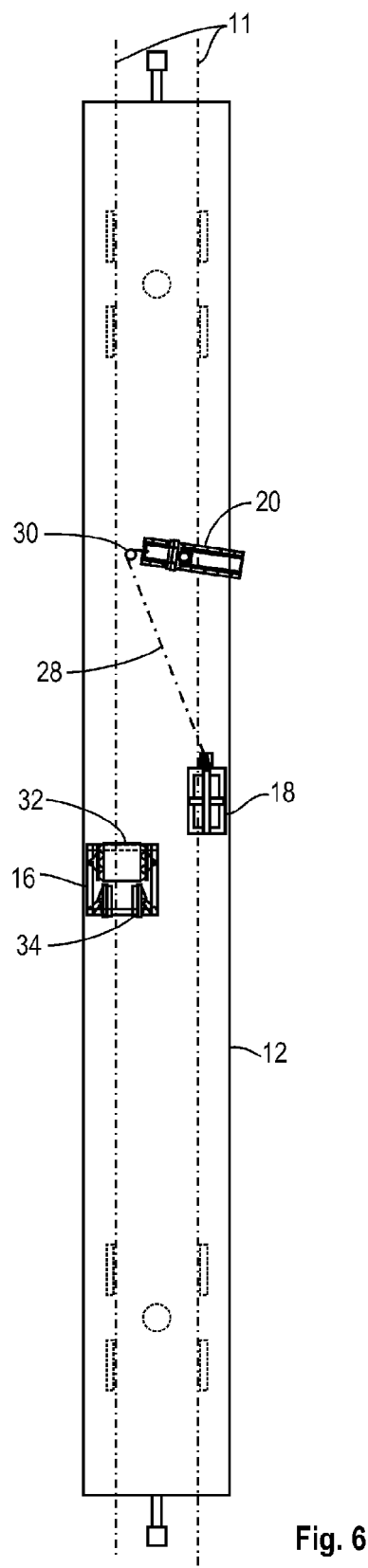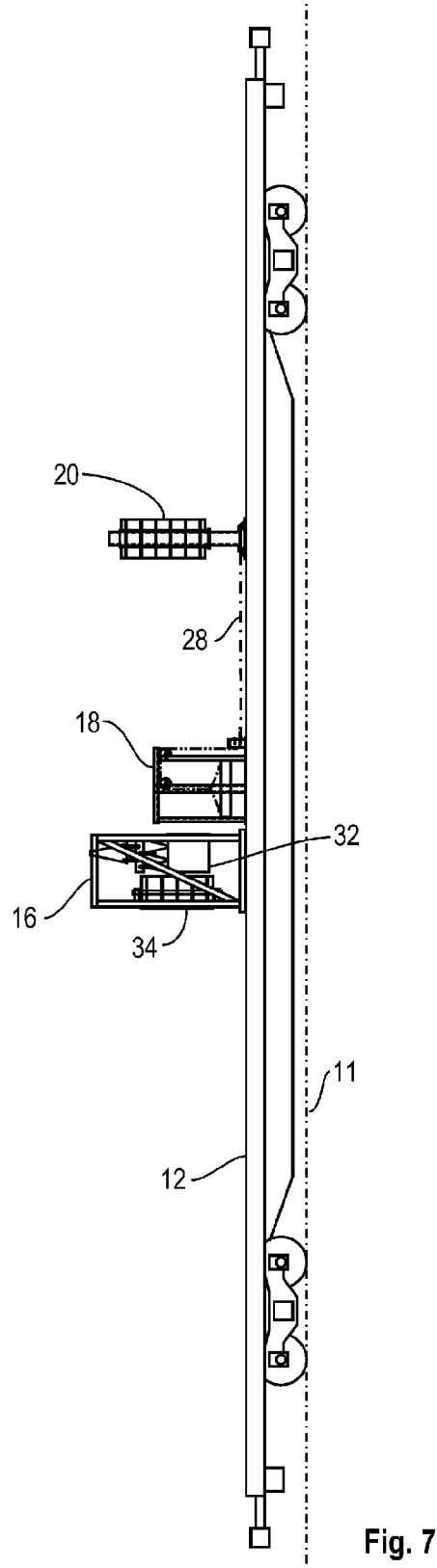
Fig. 6
Fig. 7

Section A-A

WIND TURBINE BLADE RAILROAD TRANSPORTATION SYSTEM AND METHOD

BACKGROUND OF THE INVENTION

1. Field of the Invention

The present invention relates to transporting wind turbine blades. More particularly, the present invention relates to a system and method for transporting long airfoils via railroad using a weighted assembly that applies a lateral straightening force to a curved airfoil.

2. Description of the Related Art

Large-scale wind turbines are used to generate electrical power. Such wind turbines consist of a tall tower with a generator nacelle rotatably coupled about the top of tower's vertical axis. A rotor hub extends out a horizontal axis of the nacelle. Two or more turbine blades are connected to the rotor hub at right angles to the horizontal axis. During operation, prevailing winds cause the turbine blades to rotate about the rotor hub's horizontal axis. The rotational forces are coupled to a generator within the nacelle, which produces electricity. The nacelle rotates about the vertical axis of the tower to maintain the wind turbine blades in proper orientation with the prevailing winds.

The various components of a large-scale wind turbine may be manufactured at different geographic locations, and are then transported to the ultimate power generation site where they are assembled, erected, and placed into operation. Since the manufacturing operations may be spread across the world, transportation of the components to the generation site may utilize various modes of transportation, including ships, barges, trains and trucks. The various components are expensive to manufacture, and include fragile components that must be protected and handled properly during transportation. The wind turbine blades are frequently transported by rail during some portion of the transportation process.

The evolution of technology and the economies of scale have led to the development and deployment of large-scale wind turbines with larger and larger proportions. The power generation capacity of large-scale wind turbines is directly related to the length of the turbine blades, which define the swept area and power capacity of the turbine. The wind loading stresses involved during operation, and the need to keep the total mass of the turbine blades reasonably low, has lead engineers to design and build turbine blades as monocoque structures, typically employing composite materials. The lengths of wind turbine blades now exceed 180 feet, and the trend is for longer blades in the future. Transportation of long turbine blades presents significant challenges to transportation engineers, particularly in the case of railroads, where the railroad track clearance profile is tightly limited and where the trains must traverse curved sections and complex rail yards.

Another notable aspect of wind turbine blade design is the fact that the blades flex under wind loading, and thus bend backwardly from the wind. Since the blades sweep in front of the supporting tower assembly, the increased length has created an issue where the blades may be pushed into the tower and cause damage. Wind turbine blade designers have addressed this issue by building blades with a curved profile, which are curved toward the wind and away from the tower. While this has solved the basic problem at hand, it has created new challenges for the transportation process. This is particularly true for railway transport, where limited track clearance profiles will not allow a blade to extend beyond some reasonable clearance limits both laterally and vertically. Thus it can be appreciated that there is a need in the art for a system and method addressing the problems related to transportation of curved wind turbine blades as well as other long and curved airfoil devices via rail.

SUMMARY OF THE INVENTION

The need in the art is addressed by the systems and methods of the present invention. The present disclosure teaches a system for transporting an airfoil, which has a root end, a midsection, and a tip end, over a railroad utilizing a first railcar coupled to a second railcar. The system includes a root bracket that supports the root end of the airfoil on the first railcar, and is oriented to align the tip end of the airfoil toward the second railcar. A blade support is fixed to the second railcar and is disposed to support the airfoil along its midsection. A weight is hung from a tension member on the second railcar such that the force of gravity induces tension forces along the tension member. An urging member is disposed on the second railcar and oriented to engage the airfoil between the blade support and the tip end of the airfoil. The urging member is coupled to the tension member such that the tension forces are transferred to the urging member to induce lateral forces against the airfoil.

In a specific embodiment of the foregoing system, the root bracket consists of two parts that define a vertical rotational axis, which enables the airfoil to maintain alignment as the first railcar and the second railcar traverse a curved section of the railroad. In another embodiment, the blade support includes a flexible member, which enables the airfoil to maintain alignment as the first railcar and the second railcar traverse a curved section of the railroad.

In a specific embodiment of the foregoing system, the blade support consists of a rigid frame connected to the second railcar and a flexible sling that hangs from the rigid frame, and that is positioned to support the airfoil above the second rail car. In a refinement to this embodiment, the system further includes a lateral guide fixed to the rigid frame, which is positioned to engage the airfoil and limit the lateral movement thereof. In a further refinement, a pad attached to the lateral guide and is positioned to cushion contact with the airfoil.

In a specific embodiment, the foregoing system further includes a guide cage fixed to the second railcar that is configured to restrain movement of the weight. In another embodiment, the tension member is selected from one of a cable, a cord, a rope, webbing, and a chain. In a refinement to this embodiment, the system further includes a pulley to change the direction of the tension member between the weight and the urging member. In a refinement to this embodiment, the tension member is a chain and the pulley is a standard railroad industry sheave wheel.

In a specific embodiment, the foregoing system further includes an interface pad disposed on a surface of the urging member that engages the airfoil. In another embodiment, the urging member is enabled to rotate about a vertical axis, thereby enabling the urging member to align itself with the airfoil.

In a specific embodiment of the foregoing system, the urging member further includes a lateral guide fixed to the second railcar, and a base plate retained by the lateral guide, which slides along a lateral axis. In a refinement to this embodiment, the urging member further includes a vertical post that slides with the base plate and an interface pad disposed on a surface of the urging member that engages the airfoil. In a further refinement, the interface pad rotates about the vertical post, thereby enabling the urging member to align itself with the airfoil.

In a specific embodiment of the foregoing system, the tension member has a length that is selected to allow the weight to rests on a deck of the second railcar while on a straight section of the railroad, but the weight is lifted off the deck by the tension member and the urging means under force from the airfoil due to the misalignment of the airfoil on a curved section of railroad.

The present disclosure also teaches a method for transporting an airfoil that has a root end, a tip end, and a midsection over a railroad. The method includes coupling a first railcar to a second railcar, and disposing a root bracket between the root end of the airfoil and the first railcar, and aligning the tip end of the airfoil toward the second railcar. The method further includes fixing a blade support to the second railcar, thereby supporting the airfoil along the midsection, and hanging a weight from a tension member on the second railcar, thereby inducing tension forces along the tension member by the force of gravity. Then, transferring the tension forces to a lateral urging member disposed on the second railcar, which is oriented to engage the airfoil between the blade support and the tip end of the airfoil, thereby inducing lateral forces against the airfoil.

In a specific embodiment of the foregoing method, the root bracket consists of two parts that define a vertical rotational axis, and the method also includes the step of rotating about the vertical rotational axis to maintain alignment of the airfoil as the first railcar and the second railcar traverse a curved section of railroad.

In a specific embodiment of the foregoing method, where the blade support includes a flexible member, the method further includes flexing the flexible member and thereby maintaining alignment of the airfoil alignment as the first railcar and the second railcar traverse a curved section of railroad.

In a specific embodiment of the foregoing method, where the blade support consists of a rigid frame connected to the second railcar and a flexible sling disposed from the rigid frame, the method further includes supporting the airfoil with the flexible sling. In a refinement to this embodiment, where a lateral guide is fixed to the rigid frame, the method further includes limiting the lateral movement of the airfoil using the lateral guide.

In a specific embodiment of the foregoing method, where the urging member is enabled to rotate about a vertical axis, the method further includes aligning the urging member with the airfoil by rotation about the vertical axis.

In a specific embodiment of the foregoing method further includes selecting the tension member length, thereby allowing the weight to rests on a deck of the second railcar while on a straight section of the railroad, and lifting the weight off the deck by the tension member and the urging means under force from the airfoil due to the misalignment of the airfoil on a curved section of railroad.

BRIEF DESCRIPTION OF THE DRAWINGS

FIG. 1 is a drawing of a curved wind turbine blade.

FIG. 2 is a drawing of a wind turbine blade loaded onto two rail flatcars according to an illustrative embodiment of the present invention.

FIG. 3 is a drawing of two railcars transporting a wind turbine blade through a curved section of a railway, but without a lateral urging device, according to an illustrative embodiment of the present invention.

FIG. 4 is a drawing of two railcars transporting a wind turbine blade through a curved section of a railway according to an illustrative embodiment of the present invention.

FIG. 5 is an elevation drawing of a wind turbine blade loaded onto two rail flatcars according to an illustrative embodiment of the present invention.

FIG. 6 is a plan view of a rail flatcar including a blade support, weight, and lateral urging device according to an illustrative embodiment of the present invention.

FIG. 7 is an elevation view of a rail flatcar including a blade support, weight, and lateral urging device according to an illustrative embodiment of the present invention.

DESCRIPTION OF THE INVENTION

Figure 8:
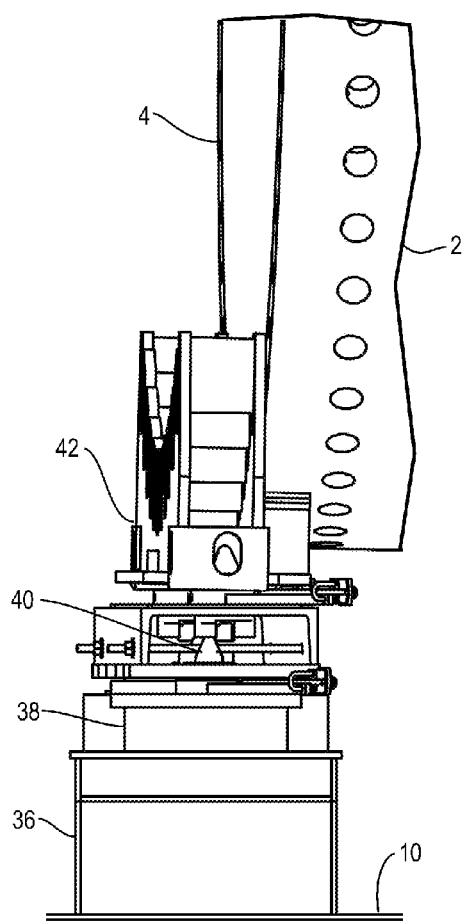
FIG. 8 is a side view drawing of a root end bracket disposed between a railcar and wind turbine blade according to an illustrative embodiment of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof and additional fields in which the present invention would be of significant utility.

In considering the detailed embodiments of the present invention, it will be observed that the present invention resides primarily in combinations of steps to accomplish various methods or components to form various apparatus and systems. Accordingly, the apparatus and system components and method steps have been represented where appropriate by conventional symbols in the drawings, showing only those specific details that are pertinent to understanding the present invention so as not to obscure the disclosure with details that will be readily apparent to those of ordinary skill in the art having the benefit of the disclosures contained herein.

In this disclosure, relational terms such as first and second, top and bottom, upper and lower, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a" does not, without more constraints, preclude the existence of additional identical elements in the process, method, article, or apparatus that comprises the element.

The teachings herein address the problems associated with transporting large wind turbine blades and other large airfoils via railroad, or by other modes of transportation where lateral clearance may be an issue. The illustrative embodiments presented are principally directed to wind turbine blades, however they are applicable to any large airfoil or similarly structured devices. Such airfoils and devices share the characteristic of a rigid root end that is designed with sufficient strength to support the entire airfoil and accommodate the flexing and stresses involved during operation thereof. Such airfoils are typically tapered through a midsection to a tip end, and, in modern designs the tip end of the airfoil is curved away from a centerline drawn perpendicularly through the root end flange. The section modulus of the airfoil gradually decreases from the root end to the tip end. Generally, the strength profile of the airfoil decreases from the root end to the tip end as well.

In considering the need to support such an airfoil during transportation, it will be appreciated that the airfoil will typically lie in a substantially horizontal orientation, and require two or more support locations. During the transportation of an airfoil, the stresses and bending loads a quite different than those encountered during normal operation. The root end of the airfoil will almost certainly have sufficient strength as a support location during transportation, and the tip end will most likely not have sufficient strength as a support location. Along some region between the root end and the tip end, there will exist sufficient strength to support the airfoil during transportation, and this region will be referred to herein as the midsection. The specific location of the midsection will vary from airfoil to airfoil. In some designs, it may be a narrowly specified portion of the airfoil length that the manufacturer has reinforced to bear transportation loads. In other designs, the midsection may be a broader region between the root end and the tip end.

At the time of this writing, certain large wind turbine blades having a length of approximately 150 feet are in service, and larger blades having a length exceeding 180 feet are now being deployed. The longer turbine blades have a more exaggerated tip curvature, which is generally straightened during operation in the presence of stronger winds loads. As was mentioned hereinbefore, this serves to insure adequate clearance with respect to the wind turbine support tower. It is expected that wind turbine blades having even longer lengths will be deployed in the future. However, the longest standard rail flatcars that are readily available have a deck length of approximately 89 feet, and a coupler-to-coupler length of approximately 94 feet. This dictates that large airfoils must overhang the length of a railroad flatcar during transportation. Prior loading systems have used two fixed and rigid support locations at either end of a single railcar, one supporting the root end of the wind turbine blade and another supporting the wind turbine blade along its midsection, with the tip of the blade extending beyond one end of the railcar. The railcar supporting the wind turbine blade is referred to as the "load" car. The second railcar, over which the tip end extends, is referred to as an "idler" car.

As the length of turbine blades has increased, designers have placed a root support on a first railcar and a midsection support on a second railcar. A critical factor in employing such a loading system is to address the alignment issues as a train rounds a short radius curve. Main line railroads may have curves as tight as 13 degrees, and some switching yards may have even shorter radius curves, perhaps as tights as 22 degrees. The inventors and assignee of the present invention have addressed such alignment issues at some length in a number or prior US patents, including U.S. Pat. No. 7,591,621 to Landrum et al., issued Sep. 22, 2009 for Wind Turbine Blade Transportation System and Method, and U.S. Pat. No. 7,670,090 to Landrum et al. for Wind Turbine Blade Transportation System and Method. The contents of both of these disclosures are hereby incorporated by reference thereto. Both of these disclosures employ load support structures that flex or slide in order to address changes in position of the blade as compared to the railcars as they transition from straight railway tracks through curved railway tracks. They also address some issues related to keeping the turbine blade within the railroad track clearance profile.

With the deployment of longer blades, exceeding 180 feet in length, and the use of more aggressive tip curvature by manufactures, the challenges of loading, supporting, and maintaining alignment of turbine blades during rail transportation has become even more challenging. Even more so, the challenges of keeping the turbine blades within the railroad track clearance profile through curves in the railway has been greatly increased. The present disclosure provides novel solutions to the aforementioned turbine blade transportation issues.

Reference is directed to FIG. 1, which is a drawing of a curved wind turbine blade. The turbine blade 2 has a length of approximately 180-feet, and has a root end 4 and a tip end 6. A centerline 5 is drawn through the center of the root end 4, and is perpendicular to the flange on the root end 4. The offset distance 8 is shown between the centerline 5 and the tip end 6. The offset distance 8 may be six to ten feet in current turbine blades. Other offsets lengths may be employed in other turbine blade designs.

Reference is directed to FIG. 2, which is a drawing of a wind turbine blade 2 loaded onto two rail flat cars 10, 12 according to an illustrative embodiment of the present invention. FIG. 2 shows an exemplary loading set-up while the railcars 10, 12 are traversing a straight section of track 11. Note that the turbine blade 2 is loaded such that the root end 4 and tip end 6 are right of the railcar centerline (not shown) and the midsection of the blade 2 is left of the centerline. This arrangement insures that the load is balanced on the railcars 10, 12, which is required for stable transport. The turbine blade 2 is supported in the first rail car 10 at its root end 4 by a root bracket assembly 14. It is further supported on the second rail car 12 at the turbine blade midsection by blade support assembly 16. Thusly, the weight of the blade is supported over the two railcars. An urging member assembly 20 is disposed on the second rail car 12, and is used to apply lateral force on the turbine blade 2, which provides a straightening action against the turbine blade curvature offset. Note that "lateral" is used to describe a direction that is substantially normal to the railcar's longitudinal centerline, as well as the centerline of the railroad 11. A weight assembly 18 is used to maintain a force created by the pull of gravity, and that force is communicated to the urging member 20 using a tension member 28. As can be determined from review of FIG. 2, the turbine blade is reasonably well located on the railcars while on a straight section of the railroad, and does not extend too far laterally to present significant issues with the railroad track clearance profile (not shown). For reference, the minimum standard clearance profile width is 10-feet, 8-inches on most US railways. The typical flatcar has a deck width of about 9-feet. Some sections of railroads have larger clearance profiles.

Reference is directed to FIG. 3, which is a drawing of two railcars 10, 12 transporting a wind turbine blade 2 through a curved section of a railway, but without a lateral urging device, according to an illustrative embodiment of the present invention. This drawing serves to illustrate the effect of track curvature on the turbine blade 2 load. The track 22 in FIG. 3 curves to the left, and the blade 2 curves to the right in this embodiment. In the case where the track would curve to the right, then the curvature of the blade is actually beneficial in avoiding problems with the track clearance profile, as will be appreciated by those skilled in the art. On the other hand, when the track curves in the opposite direction as it does in FIG. 3, then the rail car alignment exacerbates the blade clearance problems. In FIG. 3, the root end 4 of the turbine blade 2 is anchored on the first railcar 10. The midsection of the blade 2 is supported on the second railcar 12. The curvature of the blade is outward of the turn, and the curvature of the track inward to the turn, and this results in a large degree of blade extension 24 at the tip end 6. So much so, that the turbine blade is likely to exceed the rail profile clearance and impact on object on the side of the track.

Reference is now directed to FIG. 4, which is a drawing of two railcars 10, 12 transporting a wind turbine blade through a curved section of a railway 22 according to an illustrative embodiment of the present invention. This figure illustrates the advantage of the present invention. All of the components of FIG. 3 are present in FIG. 4, and FIG. 4 further adds the urging member 20, the gravity weight 18, and the tension member 28. The force induced on the weight by gravity is transferred to the urging member 20 to impart a lateral force on the turbine blade 2 between the blade support 16 and the tip end 6. This action flexes the blade inwardly and reduces the lateral extension 26 of the blade tip.

It should be noted that there are a number of design considerations in selecting the location of the blade support 16 and the location of the urging member 20, as well as the mass of the weight 18. The primary consideration is the structural and flexural characteristics of the particular turbine blade to be transported. While the blades are designed to flex under wind loading, the forces applied in that scenario are distributed along the length of the blade. And, the blade mount is essentially a cantilever from the root end 4. When the turbine blade is mounted as illustrated in FIG. 4, the support point 16 and urging member 20 are essentially concentrated loads. Thus, it is necessary to gather structural information on the blade to determine load and flex limits, and then select positions that are optimum for the particular blade. With that done, the mass of the weight can be selected to avoid over stressing the blade. By using a gravity weight, the designer is assured that a maximum lateral force will not be exceeded. This is not the case with a spring-loaded system. In addition, the length of the tension member 28 can be selected such that the weight rests on the deck of the railcar 12 while traversing a straight section of track. Then, as the railcars enter a turn, the blade offset increases, applies force to the urging member 20, which lifts the weight 18 off the railcar, thereby imparting the requisite force only when needed. Thusly, this design minimizes the total amount of stress applied to the turbine blade during transport. The added stress is only required where the railway curvature and blade curvature are opposite one another.

Reference is directed to FIG. 5, which is an elevation drawing of a wind turbine blade 2 loaded onto two rail flat cars 10, 12 according to an illustrative embodiment of the present invention. FIG. 5 generally comports with FIGS. 2 and 4. FIG. 5 illustrated two rail flatcars 10, 12, which are coupled together. The root end 4 of the turbine blade 2 is attached to the first railcar 10 using a root bracket 14. The tip 6 of the blade 2 is oriented over the second railcar 12. A blade support 16 is disposed on the second railcar 12 along the midsection of the blade 2. An urging member 20 is positioned to apply lateral force to the turbine blade 2 at a position between the blade support 16 and the blade tip 6. A weight 18 is coupled to the urging member 20 using a tension member 28.

Reference is directed to FIG. 6 and FIG. 7, which are a plan view and elevation view, respectively, of a rail flatcar 12 including a blade support 16, weight assembly 18, and lateral urging assembly 20 according to an illustrative embodiment of the present invention. The flatcar 12 rides on a railroad 11. The blade support 16 includes a support sling assembly 32 and a lateral guide assembly 34. The sling 32 supports the weight of the turbine blade and the lateral guide assembly 34 sets limits for lateral movement of the turbine blade. The urging member 20 is an assembly that converts the tension force transferred through the tension member 28 to lateral force that is applied to the turbine blade. The tension member 28 can be selected from several suitable materials, such as chain, rope, cable, cord, wire, and other materials known to those skilled in the art. The weight assembly 18 primarily consists of a mass ranging in weight from 500 to 5000 pounds, although other masses might be appropriate depending on the load configuration. The weight is located within a cage assembly to prevent lateral or fore-aft movement of the weight. The weight assembly 18 also includes plural pulleys to route the tension member 28 as required. An auxiliary pulley 30 is mounted to the railcar deck to route the tension member 28 into connection with the urging member 20.

Figure 10:
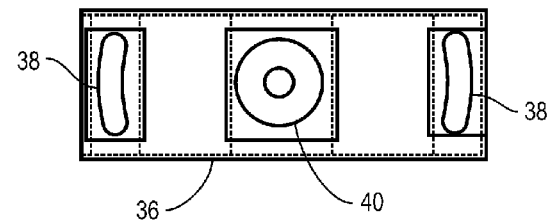
FIG. 10 is a top view drawing of a root end bracket according to an illustrative embodiment of the present invention.
Figure 9:
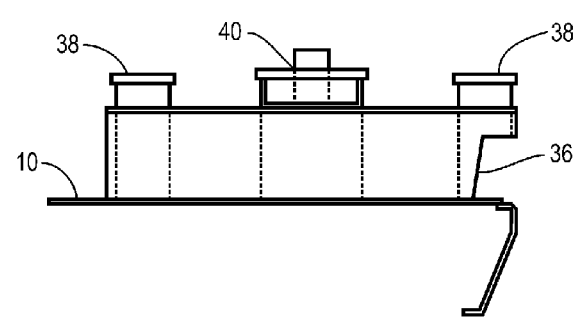
FIG. 9 is an end view drawing of a root end bracket mounted on a rail flatcar according to an illustrative embodiment of the present invention.

Reference is directed to FIG. 8, which is a side view drawing of a root end bracket assembly disposed between a rail car and wind turbine blade according to an illustrative embodiment of the present invention. Reference is also directed to FIG. 9 and FIG. 10, which are a side view drawing and a top view drawing, respectively, of a root bracket fixture according to an illustrative embodiment of the present invention. The root bracket assembly 14 is attached to the deck of the first railcar 10. The root bracket fixture 36 is typically welded to the railcar 10, and engages a root flange adapter 42, which typically stays mounted to the root end 4 of the turbine blade 2 as it is transferred from one carrier to another. The root flange adapter 42 engages a boss 40, which serves as a center pin about which the root flange adapter 42 rotates with respect to the root bracket fixture 36. This rotation is necessary because the turbine blade must rotate to accommodate misalignment with the railcars as they traverse curved and straight sections of the railroad. A pair of arcuate slots 38 are provided in the root bracket fixture 36 to allow the root flange adapter 42 to be rotatably retained therewith.

Figure 12:
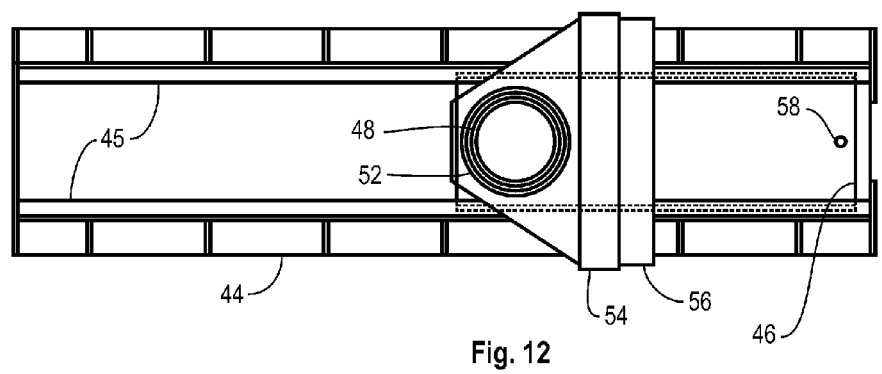
FIG. 12 is a top view drawing of an urging member assembly according to an illustrative embodiment of the present invention.
Figure 13:
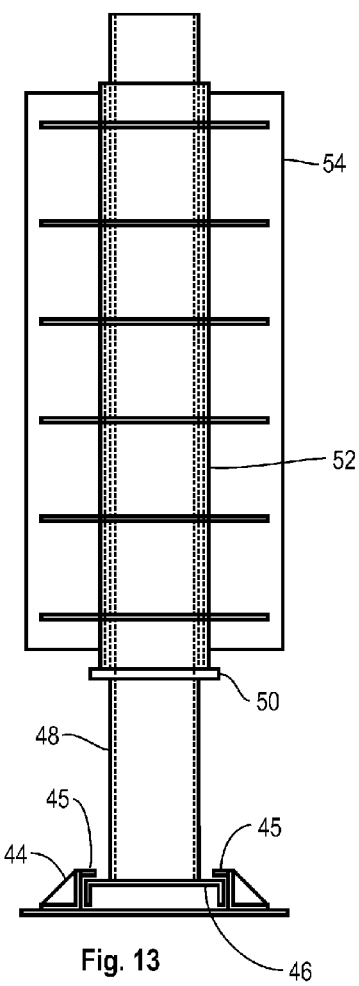
FIG. 13 is an end side view drawing of an urging member assembly according to an illustrative embodiment of the present invention.
Figure 11:
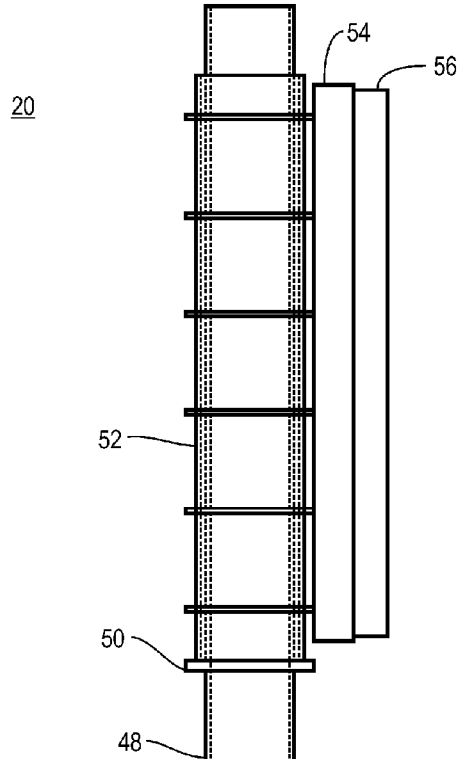
FIG. 11 is a side view drawing of an urging member assembly according to an illustrative embodiment of the present invention.

Reference is directed to FIG. 11, FIG. 12, and FIG. 13, which are a side view drawing, a top view drawing, and an end view drawing, respectively, of an urging member assembly 20 according to an illustrative embodiment of the present invention. The urging member assembly includes a base guide 44, a sliding member 46, a vertical post 48, a rotatable sleeve 52, a pivot plate 54 and a resilient pad 56. The base guide 44 is typically welded to the railcar deck (not shown), and provides a guide channel into which the sliding member 46 is retained in a laterally slidable configuration. In the illustrative embodiment, the base guide 44 is formed from angle iron and plate, which is strengthen with plural gussets, and a pair of retaining lips 45, which prevent the sliding member 46 from lifting upwardly. The liberal application of grease is beneficial to enhance the sliding action. The sliding member 46 is formed from a section a channel iron and has a tension member attachment point 58, which is used to couple the tension forces to the sliding portions of the urging member assembly 20. The vertical post 48 is rigidly fixed to the sliding member 46, and moves together therewith. The vertical post 48 has a retention flange 50 for holding the rotatable sleeve 52 at a suitable height so as to engage the turbine blade (not shown). The rotatable sleeve 52 is free to rotate about the vertical post 48, which facilitates alignment of the pivot plate 54 with the surface of the turbine blade (not shown). The pivot plate 54 is also gusseted to the rotatable sleeve 52. A closed cell polymeric pad 56 is disposed on the face of the pivot plate 54 to cushion the interface with the turbine blade (not shown). Other padded materials could be employed, as are known to those skilled in the art.

Figure 16:
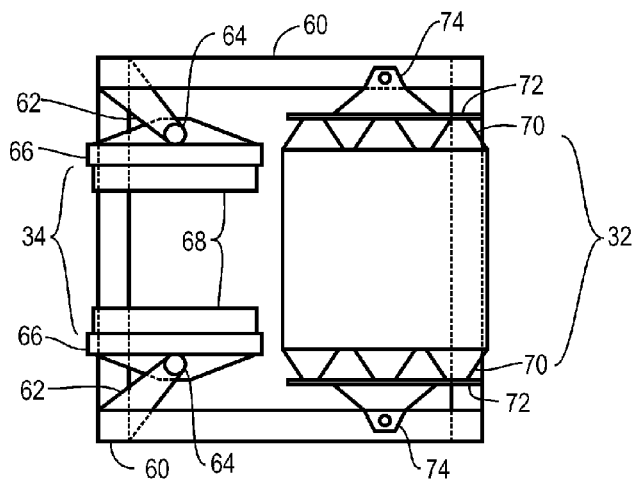
FIG. 16 is a top view drawing of a blade support assembly according to an illustrative embodiment of the present invention.
Figure 14:
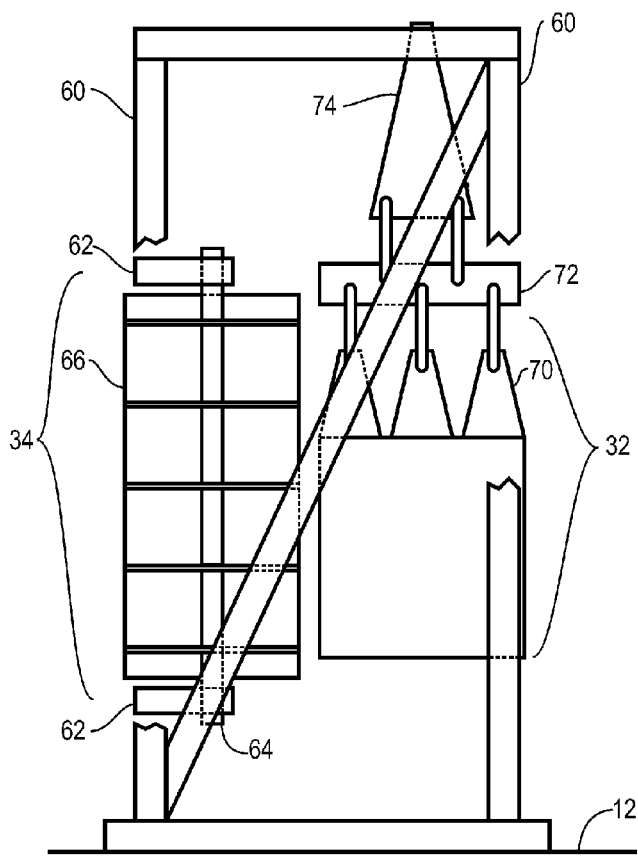
FIG. 14 is a side view drawing of a blade support assembly according to an illustrative embodiment of the present invention.
Figure 15:
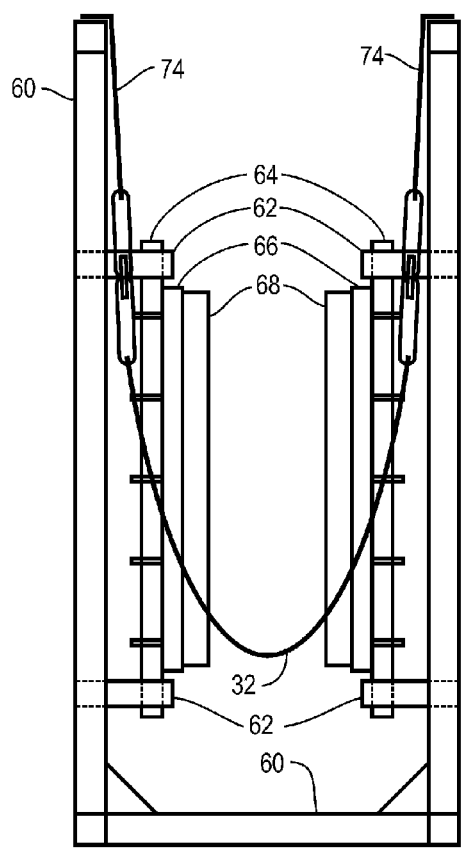
FIG. 15 is an end view drawing of a blade support assembly according to an illustrative embodiment of the present invention.

Reference is directed to FIG. 14, FIG. 15, and FIG. 16, which are a side view drawing, and end view drawing, and a top view drawing, respectively, of a blade support assembly 16 according to an illustrative embodiment of the present invention. The blade support assembly 16 provides two functions in the system. First, it supports the weight of the turbine blade along the midsection, and second, it fixes the position of the turbine blade against lateral forces. The lateral positioning function is important because the blade support assembly 16 acts as the fulcrum against which the urging member acts in the blade straightening function of the system. The blade support assembly is based on a structural frame 60, which is structural tubing in the illustrative embodiment. The frame 60 is typically welded to the deck 12 of the second railcar. The frame 60 supports two subassemblies, a support sling assembly 32 and a lateral guide assembly 34.

The support sling assembly 32 is hung from the upper members of the frame 60 using an upper hanger portion 74 that is coupled to a spreader bar 72, which in turn coupled to a sling harness 70. In the illustrative embodiment, the sling harness 32 is a heavy duty webbing strap that is selected to provide adequate contact area and tensile strength to match the weight and structural limitations of the particular turbine blade to be supported. The spreader bar 72 is cut from steel plate, and the upper hanger portion is made from chain and buckles. Those skilled in the art will appreciate that other components could be arranged to provide the support sling function of the system.

The lateral guide assembly 34 is also supported from frame 60. An opposing pair of lateral guides 66 are position to engage both the left and right side of the turbine blade (not shown) so that the assembly 34 will guide the turbine blade in both left hand and right hand railway curves. The lateral guides 66 are rotatably mounted to a pivot bar 64 so that the lateral guide 66 can orient itself with the surface of the turbine blade (not shown). The pivot bars 64 are connected to the frame 60 using a pair of mounting brackets 62, which are welded to the frame. A closed cell polymeric pad 68 is added to the surface of each lateral guide 66 to cushion the interface with the turbine blade. Those skilled in the art will appreciate that other components could be configured to provide a similar guide function.

Figure 18:
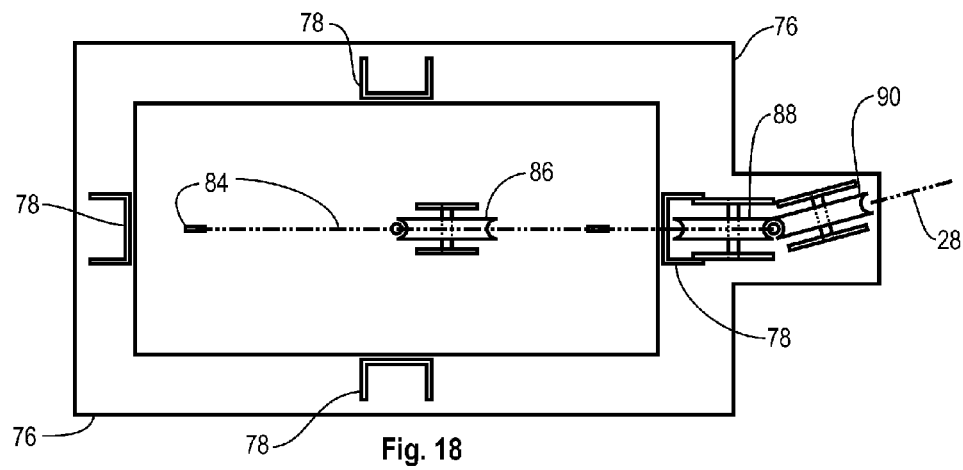
FIG. 18 is a top view drawing of a weight assembly according to an illustrative embodiment of the present invention.
Figure 17:
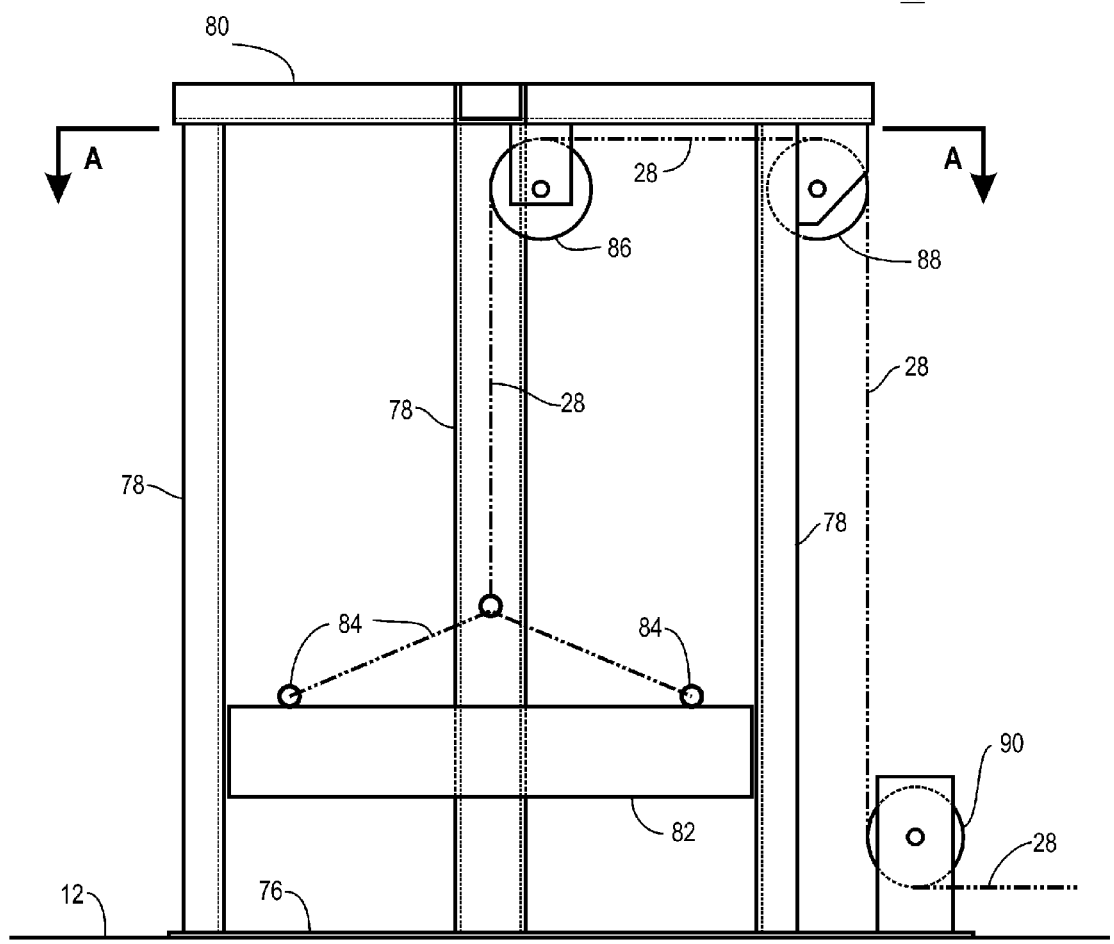
FIG. 17 is a side view drawing of a weight assembly according to an illustrative embodiment of the present invention.

Reference is directed to FIG. 17 and FIG. 18, which are a side view drawing and a top view section drawing, respectively, of a weight assembly 18 according to an illustrative embodiment of the present invention. The weight assembly 18 comprises a rigid frame including vertical channel members 78 and horizontal channel members 80, as well as a base plate 76, which is typically welded to the railcar deck 12. A massive steel weight 82 is retained from lateral movement with the frame members 78. The weight 82 is free to move vertically, such that the force of gravity acts solely on the weight 82. In the illustrative embodiments, the mass of the weight 82 ranges from 500 pounds to 5000 pounds depending on the particular turbine blade at issue. The weight 82 is suspended from a harness 84, which comprises D-rings and chain in the illustrative embodiment. Those skilled in the will appreciate that other harness assemblies could also be employed. The harness 84 is then connected to the tension member 28, which is also a chain in the illustrative embodiment.

The force induced in the weight 82 by gravity is transferred to the tension member 28 through the harness 84. The illustrative embodiment then employs a series of pulleys to route that force through the tension member 28 to the urging member (not shown) so as to apply lateral force to the turbine blade (not shown). The type of pulley employed is a design choice based in part on the type of tension member 28 that is used, such as chain, cable, rope, cord, etc. Since the illustrative embodiment employs chain for the tension member 28, the pulleys used are railroad industry standard sheave wheels suitable for use with chain, as are known to those skilled in the art. Again referring to FIGS. 17 and 18, a top pulley 86 directs the tension member 28 horizontally to a side pulley 88, which routes the tension member 28 downwardly to a direction pulley 90. Note that each of these pulleys 86, 88, 90 are rotatably mounted to the frame members 76, 78, 80 using a suitable bracket plates. The direction pulley 28 is angled to orient the tension member in the direction of the urging member (not shown). Those skilled in the art will recognize that other configurations could be utilized to suspend a weight and route the gravitational force to the urging member.

Figure 19:
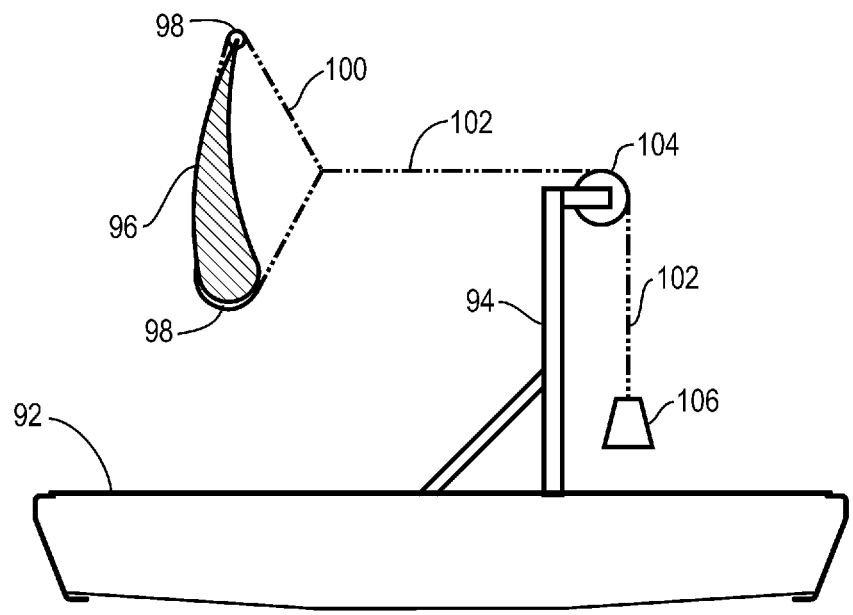
FIG. 19 is drawing of an alternative weight and urging member configuration according to an illustrative embodiment of the present invention.

Reference is directed to FIG. 19, which is drawing of an alternative weight and urging member configuration according to an illustrative embodiment of the present invention. The previously presented illustrative embodiments employed an urging member that slid laterally in a guide. This illustrative embodiment employs a more direct connection between the tension member 102 and the turbine blade 96. In this embodiment, a harness 100 is placed about the turbine blade 96 at the location where lateral force is desired. Padding 98 may be added to protect the blade 96 surface and to more evenly distribute forces. A tension member 102 is connected to the harness 100. The tension member is routed by a single pulley 104 to a suitable weight 106. A suitable support bracket 94 is fixed to the railcar 92 to support the weight and pulley arrangement.

Figure 20:
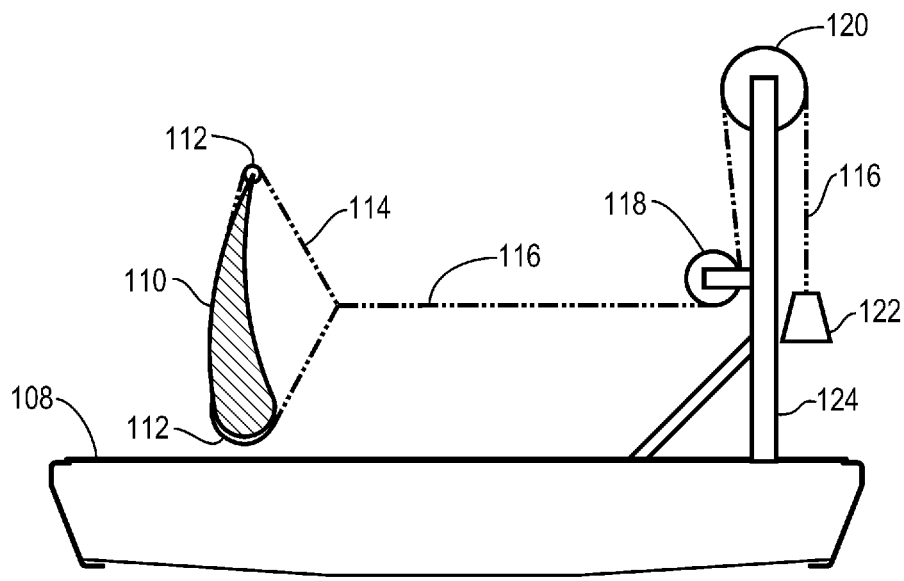
FIG. 20 is drawing of an alternative weight and urging member configuration according to an illustrative embodiment of the present invention.

Reference is directed to FIG. 20, which is drawing of an alternative weight and urging member configuration according to an illustrative embodiment of the present invention. This is another illustrative embodiment employs a more direct connection between the tension member 116 and the turbine blade 110. In this embodiment, a harness 114 is placed about the turbine blade 110 at the location where lateral force is desired. Padding 112 may be added to protect the blade 110 surface and to more evenly distribute forces. A tension member 116 is connected to the harness 114. The tension member 116 is routed by a pair of pulleys 118, 120 as shown, to a suitable weight 124. A suitable support bracket 124 is fixed to the railcar 108 to support the weight and pulley arrangement. This configuration is useful where the turbine blade 110 is located close to the deck of the railcar 108.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A system for transporting an airfoil, having a root end, a midsection, and a tip end, over a railroad utilizing a first railcar coupled to a second railcar, the system comprising:
   a root bracket disposed to support the root end of the airfoil on the first railcar, and oriented to align the tip end of the airfoil toward the second railcar;
   a blade support disposed to support the airfoil along the midsection with the tip end extending over the second railcar;
   a weight coupled to an urging member disposed on the second railcar that is oriented to engage the airfoil between said blade support and the tip end of the airfoil, and wherein the force of gravity acting on said weight is communicated to said urging member so as to induce lateral forces against the airfoil.

2. The system of claim 1, and wherein:
   said root bracket consists of two parts that define a vertical rotational axis, thereby enabling the airfoil to maintain alignment as the first railcar and the second railcar traverse a curved section of the railroad.

3. The system of claim 1, and wherein:
   said blade support includes a flexible member, thereby enabling the airfoil to maintain alignment as the first railcar and the second railcar traverse a curved section of the railroad.

4. The system of claim 1, and wherein:
   said blade support consists of a rigid frame connected to the second railcar and a flexible sling disposed from said rigid frame, and positioned to support the airfoil above the second rail car.

5. The system of claim 4, further comprising:
   a lateral guide fixed to said rigid frame, and positioned to engage the airfoil and limit the lateral movement thereof.

6. The system of claim 5, further comprising:
   a pad attached to said lateral guide and positioned to cushion contact with the airfoil.

7. The system of claim 1, further comprising:
   a guide cage fixed to said second railcar, and configured to restrain movement of said weight.

8. The system of claim 1, further comprising:
   a tension member disposed between said weight and said urging member.

9. The system of claim 8, further comprising:
   a pulley to change the direction of said tension member between said weight and said urging member.

10. The system of claim 9, and wherein
    said tension member is a chain and said pulley is a standard railroad industry sheave wheel.

11. The system of claim 1, further comprising:
    an interface pad disposed on a surface of said urging member that engages the airfoil.

12. The system of claim 1, and wherein:
    said urging member is enabled to rotate about a vertical axis, thereby enabling said urging member to align itself with the airfoil.

13. The system of claim 1, and wherein said urging member further comprises:
    a lateral guide fixed to the second railcar;
    a base plate retained by said lateral guide, and enabled to slide along a lateral axis.

14. The system of claim 13, and wherein said urging member further comprises:
    a vertical post fixed to said base plate for sliding together therewith, and
    an interface pad disposed on a surface of said urging member that engages the airfoil.

15. The system of claim 14, and wherein:
    said interface pad rotates about said vertical post, thereby enabling said urging member to align itself with the airfoil.

16. The system of claim 8, and wherein:
    said tension member has a length that is selected to allow said weight to rests on a deck of the second railcar while on a straight section of the railroad, and said weight is lifted off said deck by said tension member and said urging means member under force from the airfoil due to the misalignment of the airfoil on a curved section of railroad.

17. A method for transporting an airfoil having a root end, a tip end, and a midsection over a railroad, comprising the steps of:
    coupling a first railcar to a second railcar;
    disposing a root bracket between the root end of the airfoil and the first railcar, and aligning the tip end of the airfoil toward the second railcar;
    supporting the airfoil along the midsection using a blade support;
    coupling a weight to a lateral urging member disposed on the second railcar, which is oriented to engage the airfoil between the blade support and the tip end, and communicating the force of gravity acting on the weight to the lateral urging member, thereby inducing lateral forces against the airfoil.

18. The method of claim 17, and wherein the root bracket consists of a first part and a second part that define a vertical rotational axis, and further comprising the step of:
    rotating the first part of the root bracket about the vertical rotational axis, and thereby maintaining alignment of the airfoil as the first railcar and the second railcar traverse a curved section of railroad.

19. The method of claim 17, and wherein the blade support includes a flexible member, and further comprising the step of:
    flexing the flexible member and thereby maintaining alignment of the airfoil as the first railcar and the second railcar traverse a curved section of railroad.

20. The method of claim 17, and wherein a lateral guide is fixed to a rigid frame, and further comprising the step of:
    limiting the lateral movement of the airfoil using the lateral guide.

* * * * *